United States Patent
Hamada

(10) Patent No.: US 8,934,143 B2
(45) Date of Patent: Jan. 13, 2015

(54) APPARATUS CAPABLE OF PERFORMING SETTING FOR A PLURALITY OF SETTING ITEMS

(71) Applicant: Sharp Kabushiki Kaisha, Osaka (JP)

(72) Inventor: Ryoh Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/046,013

(22) Filed: Oct. 4, 2013

(65) Prior Publication Data

US 2014/0104647 A1    Apr. 17, 2014

(30) Foreign Application Priority Data

Oct. 11, 2012  (JP) ................. 2012-225657

(51) Int. Cl.
  *G06F 3/12*   (2006.01)
  *H04N 1/00*   (2006.01)
(52) U.S. Cl.
  CPC ................. *H04N 1/00912* (2013.01)
  USPC .......... 358/3.15; 358/1.15; 358/1.1; 709/220; 709/221; 709/222; 709/223; 709/224; 709/225
(58) Field of Classification Search
  None
  See application file for complete search history.

(56) References Cited

U.S. PATENT DOCUMENTS

| 7,729,003 B2* | 6/2010 | Kasamatsu | 358/1.16 |
| 2003/0063305 A1* | 4/2003 | McIntyre | 358/1.13 |

FOREIGN PATENT DOCUMENTS

| JP | 2002-023565 A | 1/2002 |
| JP | 2006-208475 A | 8/2006 |
| JP | 2008-191538 A | 8/2008 |

* cited by examiner

*Primary Examiner* — Paul F Payer
(74) *Attorney, Agent, or Firm* — Renner, Otto, Boisselle & Sklar, LLP

(57) ABSTRACT

When an automatic clearing function for resetting is executed in the case of no operation for a certain period of time, without occurrence of automatic clearing complicatedly and by executing automatic clearing appropriately, it is enabled to satisfy both improvement of usability by a user and convenience by automatic clearing. A control portion, when setting for a plurality of setting items is performed in accordance with operation input to the operation portion, measures time during which operation input to performing setting is not performed for each of the plurality of setting items, and executes automatic clearing to reset setting based on the measured time. When performing resetting for a setting item for which automatic clearing is executed during setting by a user, the time until executing automatic clearing is then extended.

5 Claims, 4 Drawing Sheets

APPARATUS CAPABLE OF PERFORMING SETTING FOR A PLURALITY OF SETTING ITEMS

CROSS-NOTING PARAGRAPH

This non-provisional application claims priority under 35 U.S.C. §119(a) on Patent Application No. 2012-225657 filed in JAPAN on Oct. 11, 2012, the entire contents of which are hereby incorporated herein by reference.

FIELD OF THE INVENTION

The present invention relates to an apparatus capable of performing setting for a plurality of setting items, and more specifically to an apparatus which is capable of performing user setting for a plurality of setting items and operates in accordance with the user setting.

BACKGROUND OF THE INVENTION

There are various types of apparatuses which are capable of performing setting for a plurality of setting items, in which setting for each setting item is performed in accordance with operation input by a user, and operates in accordance with the setting for each setting item.

For example, a widely-used multi-functional peripheral is taken as an example. The multi-functional peripheral has a plurality of functions of copy, a printer, facsimile, document filing and the like. In order to execute these functions and operate the multi-functional peripheral appropriately depending on the intended use, user setting for a plurality of setting items is able to be performed. For example, in the copy function, setting for a plurality of setting items relevant to the number of copies, a sheet size, a document size, a copy magnification and the like is able to be performed.

In the multi-functional peripheral, when setting for each setting item is erroneous or setting is changed by other user who has used the multi-functional peripheral already, a user is made not to be able to perform a desired operation.

Thus, by providing an automatic clearing function for, when no operation status has continued for a certain period of time, resetting setting at that time to be returned to an initial value, consideration is given to many multi-functional peripherals so as not to cause setting change that is not intended by the user.

However, it is typical that every user has a different level of understanding about a multi-functional peripheral. Accordingly, especially in such a multi-functional peripheral that is arranged in a public place and provides copy service, in a case where the automatic clearing function for clearing setting is activated when a certain period of time elapses in a state of no operation, there is a case where a not-skilled user resets the setting during an operation, and it is hard to say that its effect is sufficiently exerted.

In this regard, for example, Japanese Laid-Open Patent Publication No. 2008-191538 discloses an image forming apparatus that performs display so as to be easy to restore setting after execution of automatic clearing. This image forming apparatus is provided with automatic clearing means for resetting setting of the apparatus from user setting to standard setting, when a state of no operation by a user elapses for a predetermined period of time during the user setting, and automatic clearing release means for returning the setting of the apparatus from the standard setting to the user setting, which is received before the resetting, depending on the operation of the user after the resetting. In addition, when the standard setting is returned to the user setting after the resetting above, a setting item received immediately prior to the resetting is displayed on display means in a form different from other setting items.

Moreover, Japanese Laid-Open Patent Publication No. 2006-208475 discloses an image forming apparatus in which different setting time to automatic clearing is used before execution and after execution of copy. This image forming apparatus is provided with first automatic clearing means for clearing a set content stored in a memory for setting at the time when preset first time (for example, 30 seconds) elapses after finishing copying, and second automatic clearing means for clearing the set content set in the memory for setting in response to an effect that no next input is performed from an operation portion during preset second time (for example, 60 seconds). Thereby, the time till when the automatic clearing function works is able to be set to desired time respectively in accordance with an operation state of the image forming apparatus, so that usability is improved.

Moreover, Japanese Laid-Open Patent Publication No. 2002-23565 discloses an image forming apparatus that variably changes time until executing automatic clearing depending on difficulty of a setting item. This image forming apparatus is provided with means for judging difficulty of a set operation mode, and by determining automatic clearing time based on its judgment result, returns to an initial set operation mode in a short time from an easy set operation mode and to the initial set operation mode after longtime elapses from a difficult set operation mode. Thereby, it is possible to prevent immediate clearing of a complicated set operation mode or miscopying is caused by holding the easy set operation mode.

However, in the inventions described in the patent documents above, resetting after automatic clearing becomes easy, but ease of occurrence of automatic clearing itself is not improved. In addition, there is a problem that even by changing time until executing automatic clearing for each setting item, it is hard to obtain a useful effect for variability of user skill beyond an assumed range as described above. In this case, it is considered that by identifying a user, the skill is judged for each user to carry out automatic clearing control according to the user, but there is also a problem that in order to identify a user on the apparatus side, an extra effort is caused such as necessity of an operation to set an account for login generally.

On the other hand, by setting time until executing automatic clearing to sufficiently long time fixedly, it is possible not to cause a trouble in a user operation, but when automatic clearing is needed to the contrary, the automatic clearing operation becomes difficult to be executed, so that it becomes impossible to obtain an effect by automatic clearing.

SUMMARY OF THE INVENTION

The present invention aims to provide an apparatus capable of performing setting for a plurality of setting items, in which when an automatic clearing function for resetting setting is executed in the case of no operation for a certain period of time, without occurrence of automatic clearing complicatedly and by executing automatic clearing appropriately, it is possible to satisfy both improvement of usability of a user and convenience by automatic clearing.

An object of the present invention is to provide an apparatus capable of performing setting for a plurality of setting items for operating the apparatus, comprising: an operation portion for receiving operation input by a user, and a control portion for performing the setting for the plurality of setting items in accordance with operation input to the operation portion, wherein the control portion, when the setting for the plurality of setting items is performed in accordance with operation input to the operation portion, measures time during which operation input to performing setting is not performed for each of the plurality of setting items, and executes automatic clearing to reset setting based on the measured time, and when performing resetting for a setting item for which the automatic clearing is performed during setting by the user, extends a time until executing automatic clearing.

Another object of the present invention is to provide the apparatus capable of performing the setting for the plurality of setting items as defined in claim 1, wherein the control portion, when the plurality of setting items are set sequentially in accordance with operation input by the user, compares setting for other setting item set prior to the setting item for which the automatic clearing is executed and setting for the other setting item set prior to a setting item to be set again, when setting the setting item for which the automatic clearing is executed again, and when a result of the comparison coincides with each other, extends the time until executing the automatic clearing for the setting item to be set again.

Another object of the present invention is to provide the apparatus capable of performing the setting for the plurality of setting items as defined in claim 1, wherein the control portion changes the time until executing the automatic clearing according to the number of times of execution of the automatic clearing for the same setting item.

Another object of the present invention is to provide the apparatus capable of performing the setting for the plurality of setting items as defined in claim 3, wherein the control portion makes the automatic clearing invalid according to the number of times of execution of the automatic clearing for the same setting item.

Another object of the present invention is to provide the apparatus capable of performing the setting for the plurality of setting items as defined in claim 2, wherein the control portion, when setting the setting item for which the automatic clearing is executed again, extends the time until executing the automatic clearing, also for a setting item to beset after the setting item to be set.

PREFERRED EMBODIMENTS OF THE INVENTION

An embodiment in an apparatus of the present invention, which is capable of performing setting for a plurality of setting items, will be described below specifically. In the flowing example, though description will be given for an image forming apparatus configured as a multi-functional peripheral provided with a plurality of image processing functions, as an example of the apparatus according to the present invention, the present invention is not limited to the image forming apparatus and is widely applicable to an apparatus capable of performing setting for a plurality of setting items by a user.

Figure 1:
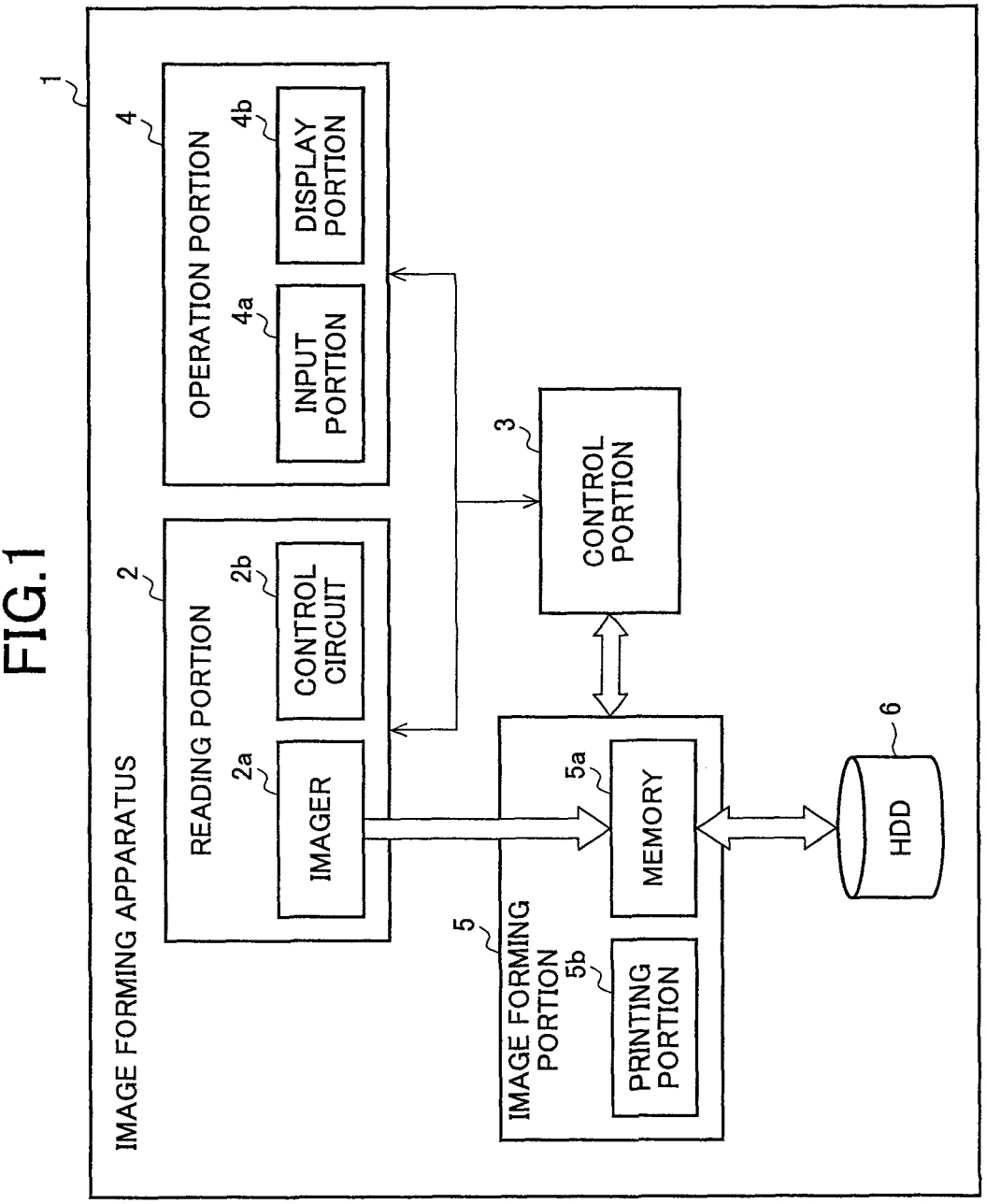
FIG. 1 is a block diagram showing a configuration example of an image forming apparatus which is an embodiment of the present invention.

FIG. 1 is a block diagram showing a configuration example of an image forming apparatus which is an embodiment of the present invention.

An image forming apparatus 1 is provided with a reading portion 2 for reading a document to generate image data, a control portion 3 for controlling each function of the image forming apparatus 1, an operation portion 4 for receiving user input, an image forming portion 5 for performing printing processing of image data, and a hard disk (HDD) 6 for storing image data and the like.

The control portion 3 of the image forming apparatus 1 is composed of a CPU for performing control operation, a RAM for storing temporary information associated with the operation, and the like. The control portion 3 includes a ROM which stores a control program for controlling the image forming apparatus 1.

To the control portion 3, the reading portion 2 for reading an image recorded in a document to generate image data is connected. This reading portion 2 is provided with a control circuit 2b for controlling an operation of the reading portion 2 and an imager 2a for loading a document image as image data in accordance with control by the control circuit 2b.

In addition, an image forming portion 5 with an image forming function for forming image data on a recording sheet is connected to the control portion 2. This image forming portion 5 is provided with a memory 5a for temporarily storing image data, and a printing portion 5b for forming an image from the image data stored in the memory 5a to record it on a recording sheet. Moreover, the hard disk (HDD) 6 is connected to the image forming portion 5. The HDD 6 stores image data stored in the memory 5a and the like.

To the control portion 3, the operation portion 4 for receiving operation input by a user is connected. The operation portion 4 is composed of an input portion 4a such as a touch panel or a numeral keypad to which information such as control command is input by an operation of a user, and a display portion 4b such as a liquid crystal panel for displaying information required for operations.

With the configuration above, by operating the input portion 4a, a user is able to perform setting for a plurality of setting items for operating the image forming apparatus 1. For example, when an operation of a copy function of the image forming apparatus 1 is set, for example, it is possible to set a plurality of setting items such as the number of copies, a sheet size, a document size and a copy magnification depending on the intended use. In this case, for example, it is possible that the control portion 3 causes the display portion 4b to display a setting screen for performing setting for setting items in accordance with a predetermined operation for the input portion 4a to perform setting with respect to each setting item depending on operation input according to the setting screen. Then, the control portion 3 causes the image forming apparatus 1 to operate in accordance with the setting with respect to each setting item.

For example, when a document image is read using the copy function to perform image formation on a recording sheet or the like, the control portion 3 sends a control signal to the reading portion 2, and the control circuit 2b of the reading portion 2 that has received this signal controls the imager 2a to read an image of a document on a not-shown document platen.

The image data of the document read by the reading portion 2 is temporarily held in the memory 5a and recorded in the HDD 6 as necessary. Then, the control portion 3 performs necessary processing such as enlargement and reduction for the image data based on the setting of each setting item according to operation input to the input portion 4a, and then causes the printing portion 5b to perform image formation (printing) on a recording sheet having a set sheet size with the number of copies set by the printing portion 5b.

The control portion 3 automatically resets setting of a setting item for operating the image forming apparatus 1 to realize a function of automatic clearing for returning the setting to an initial value. When operation input to performing setting has not been performed for a certain period of time during setting by a user, the setting at that time is reset by automatic clearing to perform control to return to an initial value. Here, while performing setting for a plurality of setting items in accordance with operation input to the input portion 4a, the control portion 3 measures time during which operation input to performing setting is not performed using a not-shown timer for each of the plurality of setting items, and executes automatic clearing for resetting the setting based on the measured time.

The control portion 3 records a setting item for which automatic clearing is executed, a past set content when automatic clearing is executed, and information such as the number of times that automatic clearing is executed for each setting item, in the HDD 6. Such information is remained as history information of automatic clearing and referenced when automatic clearing is executed next time, and when setting is performed again for the setting item for which automatic clearing is performed during setting by a user, the time until executing automatic clearing is extended based on the history information above. Thereby, worsening of usability of a user by executing automatic clearing repeatedly is prevented as well as enabling to obtain an effect by the automatic clearing function reliably.

Figure 2:
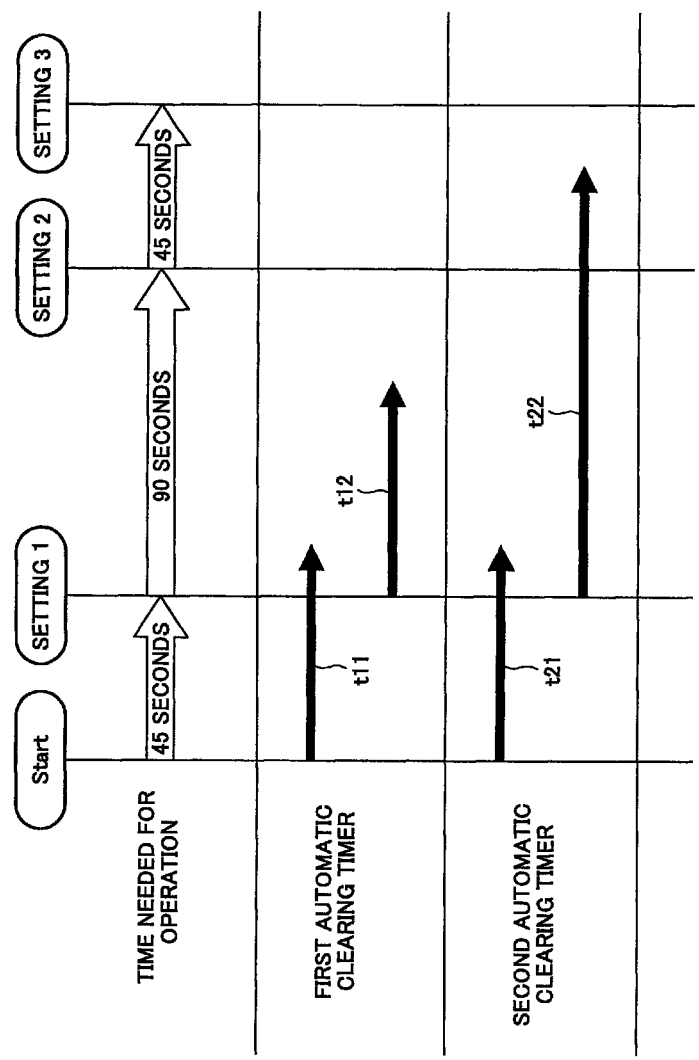
FIG. 2 is a view for explaining a control example of automatic clearing in the embodiment of the present invention.

FIG. 2 is a view for explaining a control example of automatic clearing in an embodiment of the present invention.

Here, in the image forming apparatus according to the embodiment of the present invention, settings of a setting 1, a setting 2 and a setting 3 are performed sequentially by a user operation in chronological order. The setting 1, the setting 2 and the setting 3 are settings for a part of a plurality of setting items of the image forming apparatus, and it is assumed that, for example, by completing the settings 1 to 3, the setting for a specific function of the image forming apparatus is completed.

In this case, it is assumed that when a certain user performs setting for each setting item by operation input to the operation portion 4, time needed for setting for each setting item to be completed is 45 seconds in the setting 1, 90 seconds in the setting 2, and 45 seconds in the setting 3.

As described above, the image forming apparatus has the function for executing automatic clearing. In the initial state, it is assumed that time setting until executing automatic clearing (automatic clearing timer) is set to, for example, 60 seconds for each setting item. That is, in this example, when a user sets the settings 1 to 3 sequentially, if the setting is not completed in 60 seconds for each of the settings 1 to 3, the setting of each setting item is reset.

In this case, though the user firstly sets the setting item of the setting 1, an automatic clearing timer t11 at this time indicates 60 seconds and the user is able to set the setting 1 in 45 seconds, and is therefore able to complete the setting of the setting 1.

When the setting of the setting 1 is completed, the process then moves to the setting of the setting 2. At this time, also for the setting 2, an automatic clearing timer t12 thereof is 60 seconds. Then, since 90 seconds are needed before completing the setting for the setting 2, the user is not able to complete the setting as to the setting item of the setting 2. When the automatic clearing timer is kept on having fixed length as it is, the same problem conventionally occurs as the automatic clearing timer is set with a fixed value.

When it is impossible to complete the setting with the automatic clearing timer in the initial state, the user performs setting from the setting 1 again. At this time, in the apparatus of the embodiment according to the present invention, it is possible to extend the automatic clearing timer when setting the setting 2.

Here, when the setting of the setting 1 is performed again, the control portion 3 of the image forming apparatus 1 compares the setting of the setting 1 when automatic clearing is executed in the previous time and the setting of the setting 1 when the setting is performed again. When these two settings of the setting 1 are the same, it is then judged that the setting currently performed is resetting of the setting that could not be completed by automatic clearing.

In this case, the controls portion 3 does not change an automatic clearing timer t21 in the setting 1 to be 60 seconds, but extends an automatic clearing timer t22 of the setting 2 that is executed subsequent to the setting 1 to be, for example, 120 seconds. Thereby, it becomes possible for the user to complete the setting for the setting 2 for which automatic clearing is executed because of lack of time in the previous time.

Figure 3:
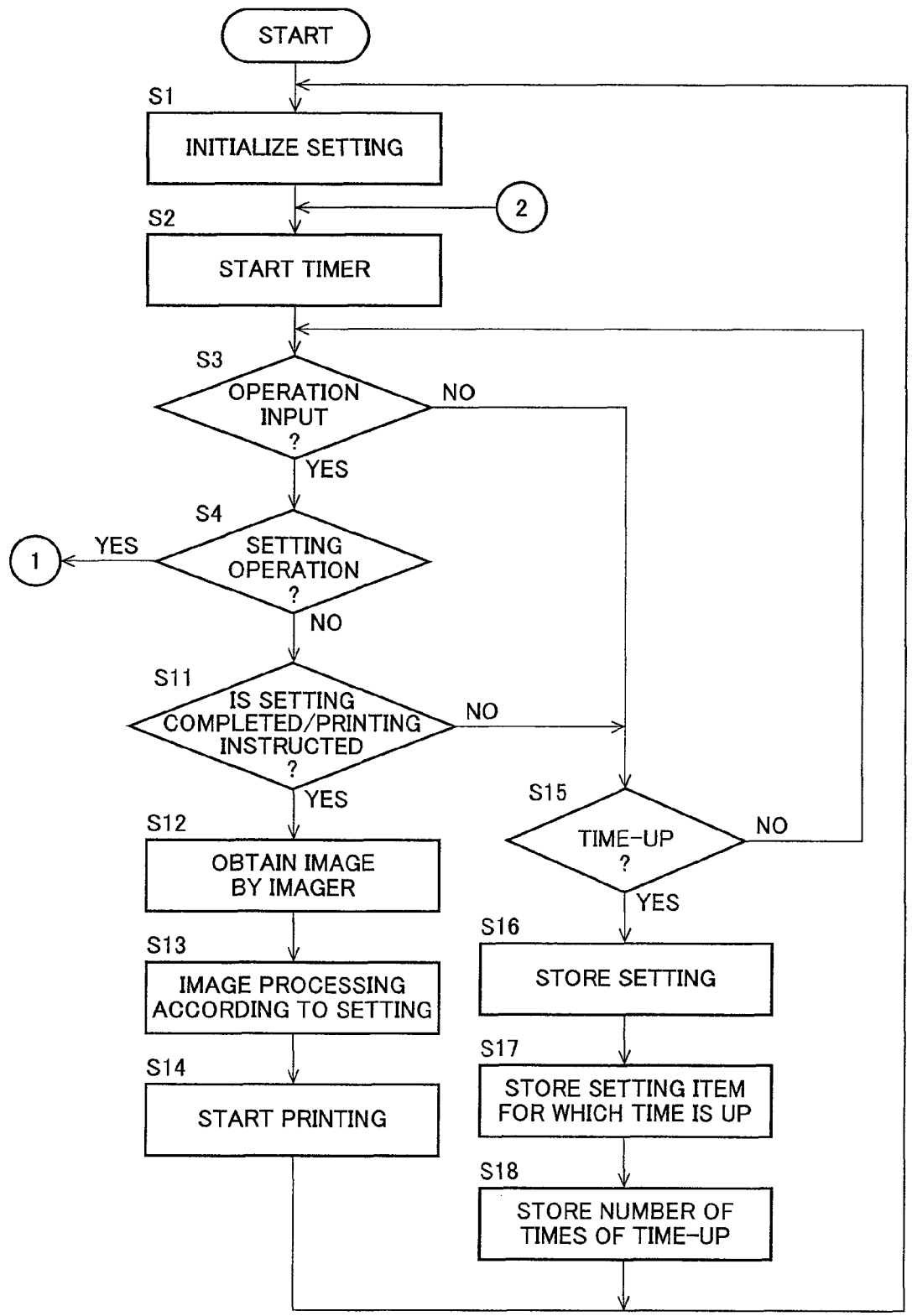
FIG. 3 is a flowchart for explaining a processing example in an apparatus capable of performing setting for a plurality of setting items according to the present invention.
Figure 4:
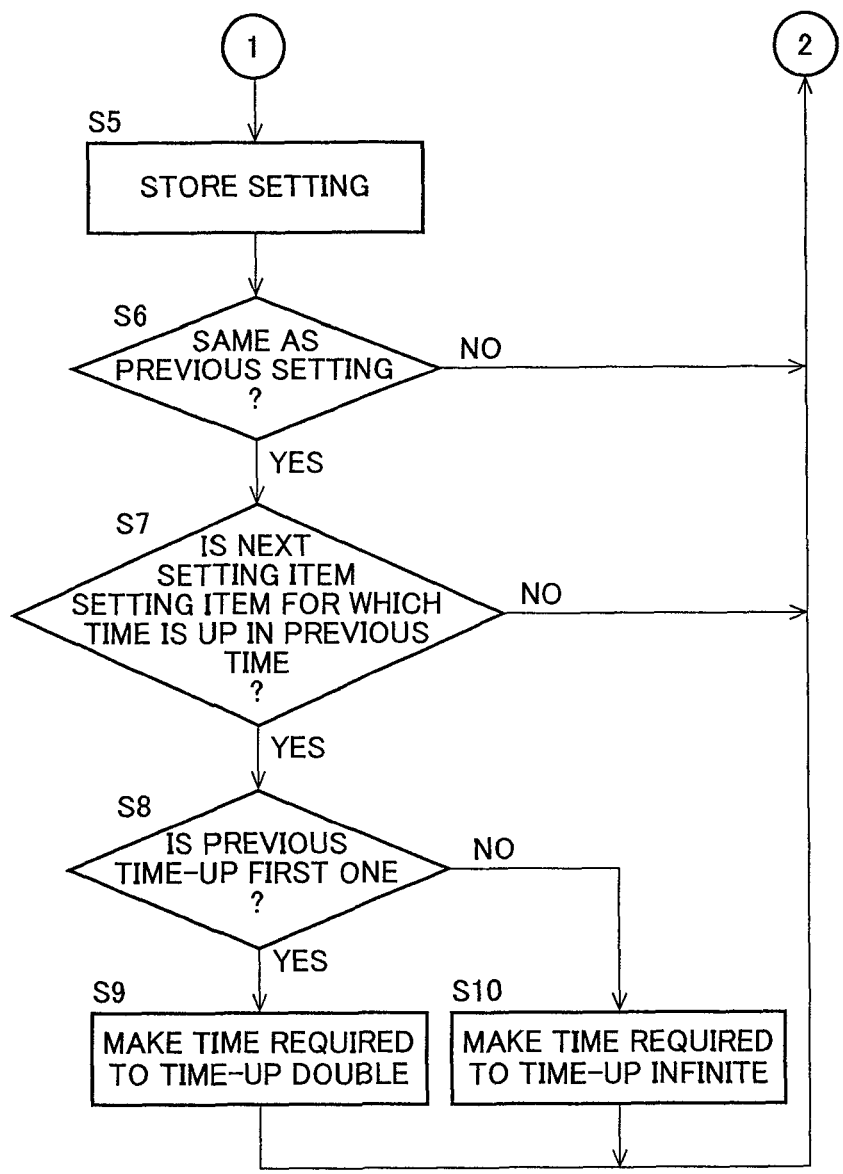
FIG. 4 is a flowchart subsequent to FIG. 3 for explaining a processing example in the apparatus capable of performing setting for a plurality of setting items according to the present invention.

FIGS. 3 to 4 are flowcharts for explaining a processing example in the apparatus capable of performing setting for a plurality of setting items according to the present invention. Here, description will be given with reference to the configuration of FIG. 1.

The control portion 3 of the image forming apparatus 1 always monitors change of setting by a user.

Here, the control portion 3 firstly initializes setting (step S1). At this time, time required to reset the setting by the automatic clearing function (automatic clearing timer) is set to, for example, 60 seconds.

The control portion 3 starts the timer and starts to measure time (step S2). The control portion 3 then judges whether or not operation input is performed for the input portion 4a (step S3). When the operation input is performed, the control portion 3 further judges whether or not the operation performed for the input portion 4a is a setting operation with respect to each setting item (step S4). Here, when the operation performed for the input portion 4a is a setting operation, setting for the setting operation is stored in a storage portion such as the HDD 6 (FIG. 4: step S5).

Then, the control portion 3 judges whether or not the stored setting is the same as setting by a previous setting operation (step S6). That is, automatic clearing is executed so that setting of all setting items is not completed at the time of the previous setting, and it is judged whether the previous setting is the same as the current setting when setting is performed for each setting item again.

In this case, when performing setting for a specific function of the image forming apparatus 1, setting is performed sequentially for a plurality of specific setting items, and when setting could be performed for all setting items, it is regarded that the setting is completed. Here, in a case where setting is performed sequentially for a plurality of setting items, when setting could not be performed for a specific setting item because of automatic clearing, if the same setting is performed for the setting item same as the setting item for which setting is completed in the previous time at the time of performing setting again, it is possible to judge as the same setting by the previous setting operation.

When the current setting coincides with the previous setting at step S6, the control portion 3 judges whether or not a setting item for which setting is, performed after the setting item with which setting coincides is the setting item for which automatic clearing is executed because time is up in the previous setting (step S7). In a case where time is up in the previous time for a next setting item, it is possible to speculate that when setting the setting item, time is up because of lack of time in the previous time and setting could not be performed for the setting item.

Here, when time is up in the previous time for the next setting item, the control portion 3 judges whether or not the previous time-up is first time-up (step S8). The first time-up is able to be defined, for example, as the first time-up after initialization of setting is performed in the wake of powering the image forming apparatus 1.

When the previous time-up is the first time-up, the control portion 3 sets the time required for the time-up (automatic clearing timer) to be double. For example, when the automatic clearing timer in the initial state is 60 seconds, extension is made to 120 seconds in the current setting.

Further, when the control portion 3 sets, when judging that the previous time-up is not the first one, the time required for the time-up (automatic clearing timer) to be infinite. That is, the automatic clearing function is substantially made invalid. When the previous time-up is not the first one, it is found that setting is performed repeatedly more than twice. Therefore, in this case, by setting the automatic clearing timer to be infinite and making automatic clearing invalid, it is possible to cause the setting to be performed reliably without executing automatic clearing. Here, it is possible to change the time of the automatic clearing timer until executing automatic clearing as appropriate depending on the number of times of execution of automatic clearing for the same setting item, such as by increasing the automatic clearing timer gradually depending on the number of times of the time-up.

When the control portion 3 resets the automatic clearing timer at step S9 or step S10, the process goes back to step S2 to start the timer again.

Further, when the current setting is not the same as the previous setting at step S6 above, and when the next setting item is not the setting item for which time is up in the previous time at step S7 above, the process also goes back to step S2 to start the timer.

When it is judged that the operation performed for the input portion 4a is not a setting operation for each setting item at step S4 above, the control portion 3 judges whether setting for all setting items is completed and a printing instruction is given (step S11). The printing instruction is given by predetermined operation input to the input portion 4a and other operations. When the printing instruction is given at step S11, by the control of the control portion 3, the control circuit 2b drives the imager 2a to scan a document placed on the document platen, thereby obtaining an image (step S12). Then, the control portion 3 performs image processing according to setting (step S13), and starts printing (image formation) by the printing portion 5b (step S14). When printing is performed, the process goes back to step S1 to initialize the setting.

When setting of all setting items is not completed and also the printing instruction is not given at step S11, the control portion 3 judges whether or not the timer reaches the time of time-up (step S15). When the timer reaches the time of time-up, the control portion 3 then stores the past settings in the HDD 6 or the like to be compared with the next setting (step S16), further stores the setting item which is being set when time-up is caused (step S17), and stores the number of times of time-up (step S18) to go back to step S1.

The content of the setting stored in step S16 to step S18, information of the setting item for which time is up and the number of times of time-up is recorded as history information of automatic clearing and used in step S6 to step S8 at the time of resetting next time, so that the time-up time in resetting is set.

With the processing above, in the embodiment of the apparatus according to the present invention, when user setting is performed sequentially for a plurality of setting items and setting is completed, history information that automatic clearing is executed is stored, and based on the history information, the time until executing automatic clearing is able to be extended in resetting. Thereby, an effect that both improvement of usability of a user and convenience by automatic clearing are satisfied is achieved.

Hereinbefore, the basic embodiment is given, and can be carried out with various modifications.

For example, when the image forming apparatus which is the embodiment of the apparatus according to the present invention is used together with, for example, an external coin vender which is disposed in public space, such an operation is possible that history information of automatic clearing is erased when a remaining amount becomes zero. To the contrary, such an embodiment is also useful that by making an operation without erasing history information of automatic clearing for a certain period of time, and based on history information accumulated in that period, an automatic clearing timer with a prescribed value is changed.

As described above, according to the present invention, it is possible to provide an apparatus capable of performing setting for a plurality of setting items, in which when an automatic clearing function for resetting setting is executed in the case of no operation for a certain period of time, without occurrence of automatic clearing complicatedly and by executing automatic clearing appropriately, it is possible to satisfy both improvement of usability by a user and convenience by automatic clearing.

The invention claimed is:

1. An apparatus capable of performing setting for a plurality of setting items for operating the apparatus, comprising:
    an operation portion for receiving operation input by a user, and
    a control portion for performing the setting for the plurality of setting items in accordance with operation input to the operation portion, wherein
    the control portion, when the setting for the plurality of setting items is performed in accordance with operation input to the operation portion, measures time during which operation input to performing setting is not performed for each of the plurality of setting items, and executes automatic clearing to reset setting based on the measured time, and
    when again performing setting for a setting item for which the automatic clearing was previously performed during setting by the user, extends a time until executing automatic clearing.

2. The apparatus capable of performing the setting for the plurality of setting items as defined in claim 1, wherein
    the control portion, when the plurality of setting items are set sequentially in accordance with operation input by the user,
    compares setting for other setting item set prior to the setting item for which the automatic clearing is executed and setting for the other setting item set prior to a setting item to be set again, when setting the setting item for which the automatic clearing is executed again, and when a result of the comparison coincides with each other, extends the time until executing the automatic clearing for the setting item to be set again.

3. The apparatus capable of performing the setting for the plurality of setting items as defined in claim 2, wherein the control portion, when setting the setting item for which the automatic clearing is executed again, extends the time until executing the automatic clearing, also for a setting item to be set after the setting item to be set.

4. The apparatus capable of performing the setting for the plurality of setting items as defined in claim 1, wherein the control portion changes the time until executing the automatic clearing according to the number of times of execution of the automatic clearing for the same setting item.

5. The apparatus capable of performing the setting for the plurality of setting items as defined in claim 4, wherein the control portion makes the automatic clearing invalid according to the number of times of execution of the automatic clearing for the same setting item.

\* \* \* \* \*